(12) United States Patent
Durand

(10) Patent No.: US 7,349,792 B2
(45) Date of Patent: Mar. 25, 2008

(54) SYSTEM FOR A VIRTUAL LIQUID SENSOR

(75) Inventor: James C. Durand, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/443,058

(22) Filed: May 31, 2006

(65) Prior Publication Data

US 2007/0277792 A1 Dec. 6, 2007

(51) Int. Cl.
*G06F 17/00* (2006.01)
*F02M 25/07* (2006.01)

(52) U.S. Cl. ............... 701/108; 123/568.12; 60/279

(58) Field of Classification Search ......... 701/29, 701/33, 45, 108; 123/563, 568.12; 60/278, 60/279, 605.2
See application file for complete search history.

(56) References Cited

U.S. PATENT DOCUMENTS

| | | | |
|---|---|---|---|
| 5,947,063 A * | 9/1999 | Smith et al. ............... 123/3 |
| 6,301,887 B1 | 10/2001 | Gorel et al. |
| 6,367,256 B1 | 4/2002 | McKee |
| 6,681,171 B2 | 1/2004 | Rimnac et al. |
| 6,725,847 B2 | 4/2004 | Brunemann et al. |
| 6,725,848 B2 | 4/2004 | Ramamurthy et al. |
| 6,728,625 B2 | 4/2004 | Strubhar et al. |
| 6,748,741 B2 | 6/2004 | Martin et al. |
| 6,868,840 B2 | 3/2005 | Lewallen |
| 6,886,336 B2 | 5/2005 | Super et al. |
| 6,934,621 B2 | 8/2005 | Bhargava et al. |
| 6,948,475 B1 | 9/2005 | Wong et al. |
| 6,978,772 B1 | 12/2005 | Dorn et al. |
| 2003/0136390 A1 | 7/2003 | Ramamurthy et al. |
| 2005/0021218 A1 | 1/2005 | Bhargava et al. |
| 2006/0016439 A1 | 1/2006 | Tussing et al. |

* cited by examiner

*Primary Examiner*—Willis R. Wolfe, Jr.
*Assistant Examiner*—Johnny H. Hoang
(74) *Attorney, Agent, or Firm*—Finnegan, Henderson, Farabow, Garrett & Dunner

(57) ABSTRACT

A system for a virtual liquid sensor is disclosed including a method for operating the liquid sensor. The method includes determining a rate of generating condensation with respect to the component. The method also includes determining a rate of purging condensation with respect to the component. The method further includes determining an amount of accumulated condensation with respect to the component as a function of the rate of generating condensation and the rate of purging condensation over a given period of time.

20 Claims, 3 Drawing Sheets

SYSTEM FOR A VIRTUAL LIQUID SENSOR

TECHNICAL FIELD

The present disclosure relates to a system for a virtual liquid sensor and, more particularly, to a method and apparatus for a virtual liquid sensor.

BACKGROUND

Turbocharged and/or supercharged engine systems typically include a compressor and an air cooler upstream of one or more combustion chambers of an engine. Often, the combustion air comprises a mixture of ambient air and recirculated exhaust gas in an attempt to reduce undesirable emissions produced during combustion. Recirculated exhaust gas often includes considerable amounts of water vapor and, in relatively cold environments, the temperature of the combustion air may be lowered below the dew point of the combustion air resulting in condensation developing within the air cooler. Under relatively high engine load conditions, e.g., at high torque, an air flow rate of the combustion air may be sufficient to purge the condensation from the air cooler. Under relatively low engine load conditions, e.g., at idle, the air flow rate of the combustion air may be insufficient to purge the condensation and, as such, an amount of liquid may accumulate within the air cooler. Accumulated liquid may be subsequently purged from the air cooler at increased engine load conditions, however, rapid engine increases may deliver a substantial amount of liquid toward the engine which may undesirably affect engine and/or air cooler durability and/or performance. Additionally, accumulated liquid may remain within the air cooler and may freeze causing mechanical damage to one or more components of the air cooler. Furthermore, the accumulated liquid within the air cooler may be aerated potentially causing physically sensed liquid levels to be inaccurate and/or difficult to determine.

U.S. Pat. No. 6,301,887 ("the '887 patent") issued to Gorel et al. discloses a low pressure exhaust gas recirculation system. The system of the '887 patent includes an intercooler receiving compressed combustion air from a compressor and delivering cooled combustion air to combustion chambers of an engine. The combustion air includes a mixture of filtered ambient air and recirculated exhaust gas. The intercooler of the '887 patent includes a reservoir that removes condensed water formed within the intercooler from the combustion air stream directed toward the combustion chambers. The reservoir of the '887 patent includes a drain that removes water collected within the reservoir when a sensed pressure of the condensed water is positive.

Although the method of the '887 patent may remove accumulated liquid from an air cooler, it requires a reservoir to collect the liquid and a drain to remove the liquid from the reservoir. Because the liquid may be acidic, the reservoir and drain are either anti-corrosive or susceptible to deterioration. Although, the system of the '887 patent may sense a pressure of liquid within the reservoir, it may not determine the amount of liquid therein. Because the system of the '887 patent may not reduce the amount of recirculated exhaust gas, the amount of liquid formed within the intercooler may not be reduced and acidic water may be undesirably drained to an environment.

The present disclosure is directed to overcoming one or more of the shortcomings set forth above.

SUMMARY OF THE INVENTION

In one aspect, the present disclosure is directed to a method for operating a virtual liquid level sensor with respect to an engine system component. The method includes determining a rate of generating condensation with respect to the component. The method also includes determining a rate of purging condensation with respect to the component. The method further includes determining an amount of accumulated condensation with respect to the component as a function of the rate of generating condensation and the rate of purging condensation over a period of time.

In another aspect, the present disclosure is directed to a virtual liquid sensor for an air cooler associated within an engine system having exhaust gas recirculation. The virtual liquid sensor includes a first sensor configured to produce a first signal indicative of a flow rate of combustion air directed through the air cooler. The virtual liquid sensor also includes at least one second sensor configured to produce at least one second signal indicative of at least one parameter associated with the engine system. The virtual liquid sensor further includes a controller configured to receive the first signal and the at least one second signal and determine an amount of condensation accumulated within the air cooler as a function of the first signal and the at least one second signal.

In yet another aspect, the present disclosure is directed to a method for controlling exhaust gas recirculation with respect to an engine. The method includes determining a level of liquid within a combustion air cooler as a function of at least one dimension of the combustion air cooler, at least one parameter of the engine, and a flow rate of combustion air through the combustion air cooler. The method also includes reducing an amount of exhaust gas recirculated from downstream of the engine toward a mixer when the determined level of liquid is greater than a predetermined value.

DETAILED DESCRIPTION

Figure 1:
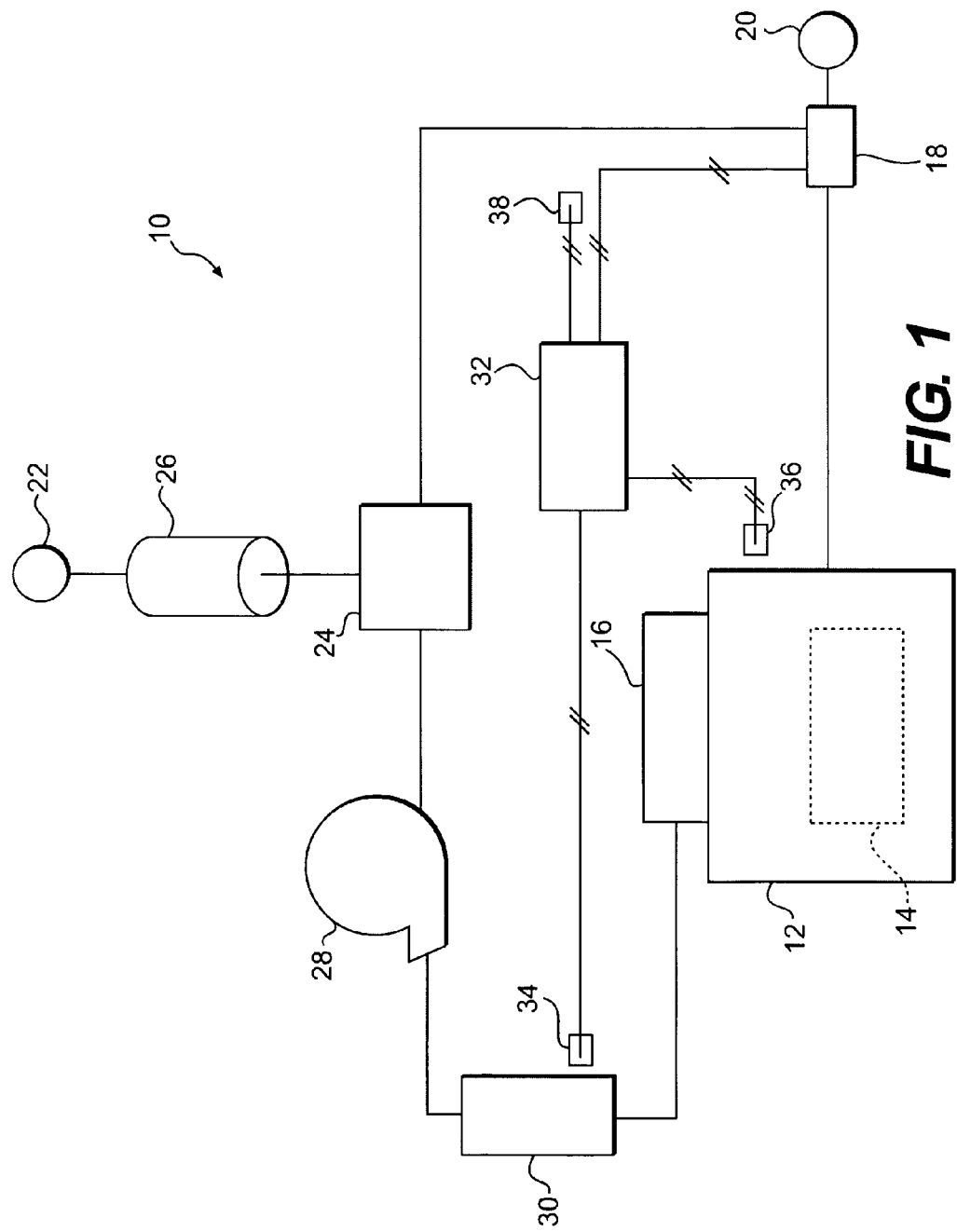
FIG. 1 is a schematic illustration of an exemplary engine system including a virtual liquid sensor in accordance with the present disclosure.

FIG. 1 illustrates an exemplary engine system 10. Engine system 10 may include an engine 12 having one or more combustion chambers 14 and an inlet manifold 16. Engine 12 may be configured to transform potential chemical energy, e.g., fuel, into mechanical energy, e.g., torque, via a combustion process, e.g., a two or four cycle piston-cylinder combustion arrangement. Exhaust gas may be directed from combustion chambers 14 toward an environment 20 for release thereto. A portion of the exhaust gas may selectively be directed to a mixer 24 via a valve 18. Valve 18 may include a solenoid actuated variable output valve configured to divert a portion of the exhaust gas produced within combustion chambers 14 toward mixer 24. Engine system 10 may also include an air filter 26 configured to filter ambient air received from an environment 22 and direct the filtered air toward mixer 24. Environments 20 and 22 may be the same or different environments and may, for example, include ambient air at any ambient condition. The recirculated exhaust gas, diverted via valve 18, and the filtered air, directed from filter 26, may be combined within mixer 24 to establish combustion air directed toward combustion chambers 14. The combustion air may be compressed via a compressor 28, directed through an air cooler 30 to reduce temperature, directed to inlet manifold 16, and subsequently communicated to combustion chambers 14.

It is contemplated that each of the components of engine system 10 described above may embody and/or include any conventional type of component known in the art, such as, for example, an internal combustion engine, e.g., a gasoline or diesel engine, an air filter including a fibrous fabric particulate filter, a gas mixing device, e.g., a pipe union, a heat exchanger, e.g., an air or liquid cooled heat exchanger, and/or a turbocharged or supercharged compressor system. Accordingly, such components are not described in greater detail. It is, also contemplated that engine system 10 may include any quantity of additional components known in the art, such as, for example, one or more fans (not shown), an exhaust gas cooler, (not shown), an exhaust gas particulate filter (not shown), a muffler (not shown), and/or a catalytic converter (not shown).

Engine system 10 may further include a controller 32 configured to virtually sense a level of liquid within air cooler 30 and further configured to control valve 18 to selectively effect an amount of exhaust gas diverted toward mixer 24. Controller 32 may include one or more microprocessors, a memory, a data storage device, a communications hub, and/or other components known in the art. It is contemplated that controller 32 may be integrated within a general control system capable of controlling additional functions of engine system 10, e.g., selective control of engine 12, and/or additional systems operatively associated with engine system 10, e.g., selective control of a transmission system. Controller 32 may be configured to receive input signals from a plurality of sensors 34, 36, 38, perform one or more algorithms to determine appropriate output signals, and may deliver the output signals to valve 18. It is contemplated that controller 32 may receive and deliver signals via one or more communication lines (not referenced) as is known in the art.

Sensors 34, 36, 38 may include any conventional sensor configured to establish a signal indicative of a physical parameter. Specifically, sensor 34 may include a mass flow rate sensor configured to produce a signal indicative of a mass flow rate of the combustion air through air cooler 30. Sensor 36 may include one or more sensors each configured to produce one or more signals indicative of various engine parameters, such as, for example, engine speed, fuel rate, coolant temperature, and/or any other parameter known in the art. Sensor 38 may include one or more sensors each configured to produce one or more signals indicative of various parameters of engine system 10, such as for example, a mass flow rate, e.g., of exhaust gas directed toward mixer 24 or of filtered air directed toward mixer 24, temperature, e.g., compressor outlet temperature or ambient air temperature, pressure, e.g., ambient air pressure, and/or any other parameter of engine system 10, as desired. It is contemplated that sensors 34, 36, 38 may be disposed at any location relative to air cooler 30, engine 12, and engine system 10, respectively, and are shown at particular locations for exemplary purposes only.

Figure 2:
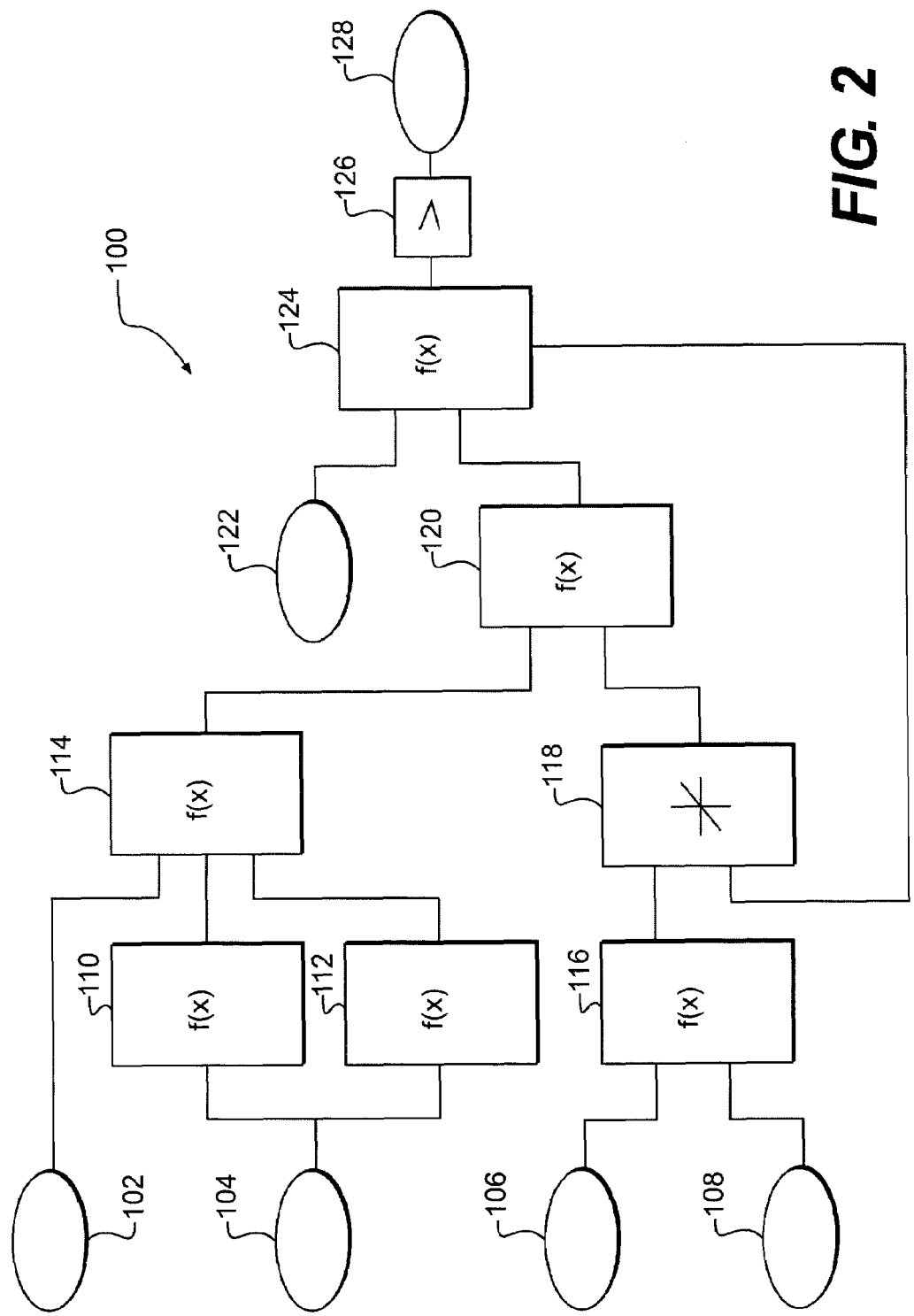
FIG. 2 is a diagrammatic illustration of an exemplary control algorithm configured to be performed by the controller of FIG. 1.

FIG. 2 illustrates an exemplary control algorithm 100. Control algorithm 100 may be performed by controller 32 to virtually sense a level of liquid, e.g., condensed water vapor mixed with one or more other substances, accumulated within air cooler 30. Control algorithm 100 may determine an output 128, as a function of the virtually sensed liquid level to influence the control and/or operation of valve 18 and, correspondingly, the amount of exhaust gas recirculated toward inlet manifold 16. Control algorithm 100 may include receiving a plurality of inputs, e.g., signals generated by one or more sensors, and perform a plurality of functional relations, e.g., algorithms, equations, subroutines, look-up maps, tables, and/or comparisons, to influence the operation of valve 18. It is contemplated that the functional relations of control algorithm 100 described below may be performed in any order and are described herein with a particular order for exemplary purposes only. It is also contemplated that control algorithms 100 may be performed continuously, periodically, with or without a uniform frequency, and/or singularly.

Referring to FIG. 2, input 102 may include a signal indicative of a relative humidity of the ambient air within environment 20 and/or environment 22. It is contemplated that input 102 may include a predetermined value indicative of the actual relative humidity of the ambient air. For example, input 102 might may be established as a constant value of relative humidity, e.g., 100%, 90%, or 80%, instead of being established via a sensor, to provide conservative and/or non-varying ambient air relative humidity for subsequent manipulation within one or more functional relations of control algorithm 100. Input 104 may include one or more signals indicative of one or more engine parameters and/or engine system parameters, e.g., signals from sensors 36, 38. Input 106 may be indicative of a flow rate of combustion air directed through air cooler 30, e.g., a signal from sensor 34. Input 108 may include one or more signals indicative of the geometry of air cooler 30, e.g., signals indicative of the height and/or depth of air cooler 30. It is contemplated that input 108 may be configured to normalize one or more functional relations within control algorithm 100 with respect to different size and/or types of air coolers and that such signals may be configured to be indicative of the outer most dimensions of air cooler 30. For example, input 108 may be indicative of the outer wall dimensions of an ambient air cooler in which ambient air surrounds and transfers heat from tubes that contain combustion air. It is also contemplated that an axis of a height dimension may be parallel to the direction of gravity, that an axis of a depth dimension may be perpendicular to the axis of the height dimension, and that input 108 may include one or more predetermined values indicative of the geometry of air cooler 30.

Functional relation 110 may be configured to determine the rate of water vapor produced during a combustion process. Specifically, functional relation 110 may functionally relate one or more engine parameters, e.g., one or more signals from input 104, to determine the amount of water vapor produced as a by-product of the combustion process. For example, functional relation 110 may functionally relate the amount of fuel, the amount of combustion air, the temperature of engine 12, and/or any other suitable parameter to determine the amount of water vapor produced from combustion. It is contemplated that the amount of water vapor produced during a combustion process may be stoichiometrically determined and may be functionally influenced by the type of fuel, e.g., diesel or gasoline, the amount of oxygen within combustion chambers 14, and one or more other parameters as is known in the art.

Functional relation 112 may be configured to determine the amount and/or percentage of exhaust gas within the combustion air. Specifically, functional relation 112 may functionally relate one or more engine parameters, e.g., one or more signals from input 104, to determine the amount of exhaust gas recirculated via valve 18 from combustion chambers 14 toward mixer 24 and thus the percentage of combustion air formed by exhaust gas. For example, functional relation 112 may functionally relate a position of valve 18, a speed of engine 12, a temperature of engine 12, a rate of fuel delivered toward engine 12, and/or any other suitable parameters to determine the amount and/or percentage of exhaust gas within the combustion air.

Functional relation 114 may be configured to determine the rate of condensation generated within air cooler 30. Specifically, functional relation 114 may functionally relate the relative humidity of the ambient air, e.g., input 102, the amount of water vapor produced from combustion, e.g., as determined within functional relation 110, and the amount of exhaust gas recirculated within the combustion air, e.g., as determined within functional relation 112. Functional relation 114 may functionally estimate an amount of water vapor within the combustion air by functionally relating the relative humidity of ambient air, e.g., air upstream of air filter 26, the water vapor produced during the combustion process, and the amount of exhaust gas within the combustion air. As such, the water vapor within both the filtered air and the exhaust gas and the relative fractions of the combustion air that each constituent forms may be related to determine the amount of water vapor within the combustion air. For example, functional relation 114 may mathematically represent an equation, such as, $R_g=F \times k_1 \times y_2$, wherein $R_g$ represents the rate of condensation generated, F represents the fuel rate, $k_1$ represents a constant, and $y_2$ represents a variable factor determined as a function of the amount exhaust gas within the combustion air. It is contemplated that $k_1$ and $y_2$ may be empirically determined.

Functional relation 116 may be configured to determine the mass velocity of combustion air directed through air cooler 30. Specifically, functional relation 116 may functionally relate the mass flow rate of combustion air through air cooler 30, e.g., input 106, and the geometry of air cooler 30, e.g., input 108. For example, functional relation 116 may determine a cross sectional area of air cooler 30 as a function of a height and depth of air cooler 30 and divide the mass flow rate of combustion air by the cross sectional area. It is contemplated that the cross sectional area may be indicative of the area through which the combustion air flows, e.g., an area surrounding a plurality of tubes that contain ambient air. It is also contemplated that functional relation 116 may include one or more constants and/or factors configured to account for obstacles within the air flow path, e.g., the tubes.

Figure 3:
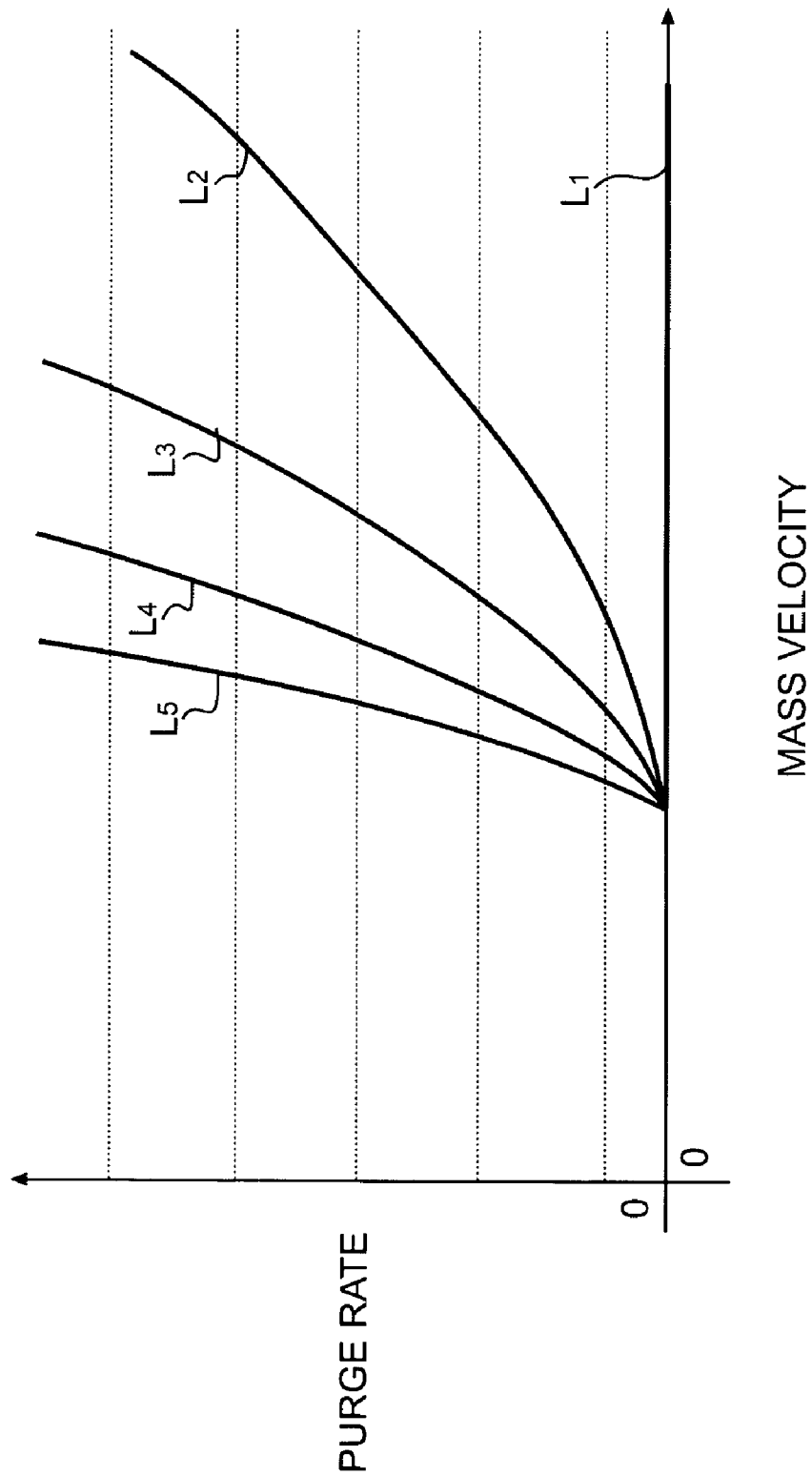
FIG. 3 is a graphical illustration of a exemplary multi-dimensional map configured to be accessed by the controller of FIG. 1.

Functional relation 118 may be configured to determine the rate of condensation removed, e.g., purged, from within air cooler 30. Specifically, functional relation 118 may functionally relate the combustion air velocity, e.g., as determined within functional relation 116, and a previously determined level of liquid within air cooler 30, e.g., as determined within functional relation 124, within one or more multi-dimensional look-up maps. For example, functional relation 118 may include a multi-dimensional look-up map as illustrated in FIG. 3. FIG. 3 illustrates an exemplary look-up map functionally relating mass velocities (x-axis) with purge rates (y-axis) for different levels of liquid ($L_1$, $L_2$, ..., $L_5$). It is contemplated that the functional relationship for increasing mass velocities may or may not be linear with respect to increasing purge rates and that, as illustrated, liquid level $L_5 > L_4 > ... > L_1$. It is also contemplated that the multi-dimensional map of FIG. 3 may be populated with data empirically determined via any suitable method known in the art, such as, for example, test data. It is further contemplated that the level of liquid within air cooler 30 may be predetermined to a particular value, e.g., zero, for a first sequence of control algorithm 100.

With continued reference to FIG. 2, functional relation 120 may be configured to determine an amount of condensation accumulated within air cooler 30. Specifically, functional relation 120 may functionally relate the rate of condensation generated within air cooler 30 and the rate of condensation purged from within air cooler 30 to functionally determine the rate of condensation accumulated within air cooler 30. For example, functional relation 120 may functionally add the rate of condensation generated within air cooler 30 and subtract the rate of condensation purged from within air cooler 30 with respect to a previously determined rate of accumulated condensation within air cooler 30. Additionally, functional relation 120 may functionally relate the rate of condensation accumulated within air cooler 30 with respect to a given time period, e.g., integrated with respect to time, to determine an amount of condensation within air cooler 30. As such, control algorithm 100 may virtually determine an amount of liquid within air cooler 30. It is contemplated that condensation within air cooler 30 may or may not combine with one or more gaseous acids and/or other gaseous components to form liquid solutions. It is also contemplated that a given time period may include any duration, e.g., the time between successive sequences of control algorithm 100 and/or a predetermined time period. It is further contemplated that functional relation 120 may, alternatively, functionally relate the rate of condensation generated within air cooler 30 and the rate of condensation purged from air cooler 30 separately with respect to a given time period, e.g., integrated with respect to time. As such, functional relation 120 may subsequently add an amount of condensation generated and subtract an amount of condensation purged with respect to a previously determined amount of condensation to determine an amount of condensation within air cooler 30.

Input 122 may include a signal indicative of the geometry of air cooler 30, e.g., a signal indicative of the depth of air cooler 30. It is contemplated that input 122 may be configured to normalize one or more functional relations within control algorithm 100 with respect to different size and/or type of air coolers and, similar to input 108, may be configured as an outer most dimension of air cooler 30. It is also contemplated that input 122 may or may not be substantially identical to the depth dimension of input 108.

Functional relation 124 may be configured to determine a level of condensed liquid within air cooler 30. Specifically, functional relation 124 may functionally relate the amount of liquid accumulated within air cooler 30, e.g., as determined within functional relation 120, and the depth of air cooler 30, e.g., input 122. For example, functional relation 124 may mathematically represent an equation, such as, for example, $L=k_1+(k_2 \times r)+(k_3 \times r^2)+(k_4 \times r^3)$, wherein L represents the liquid level within air cooler 30, $k_1$, $k_2$, $k_3$, and $k_4$ represent constants, and r represents a ratio of the amount of accumulated liquid within air cooler 30 with respect to the depth of air cooler 30. It is contemplated that $k_1$, $k_2$, $k_3$, and $k_4$ may represent any constant and may be empirically determined.

Functional relation 126 may be configured to compare the level of condensed liquid and a predetermined value and establish output 128 as a function thereof. Specifically, functional relation 126 may compare the level of condensed liquid, as determined within functional relation 124, with a predetermined value indicative of a desired and/or acceptable level of liquid, to determine if the determined level of liquid is greater than the predetermined value. For example, if the determined level of liquid is greater than the predetermined value, output 128 may be configured to, via controller 32, limit or discontinue exhaust gas recirculation by, for example, influencing valve 18 to close. Also, if the determined level of liquid is less than or equal to the predetermined value, output 128 may be configured to not, via controller 32, limit or discontinue exhaust gas recirculation. It is contemplated that output 128 may be configured as a flag criteria and, as such, may be configured to only limit or discontinue exhaust gas recirculation when a level of liquid within air cooler 30 is greater than a predetermined value. It is also contemplated that functional relation 126 may or may not include a margin of error factor, e.g., a percentage or fixed value increase to account for mathematical rounding discrepancies and/or other computational inaccuracies as is known in the art. As such, controller 32, sensors 34, 36, 38, and, in particular control logic 100, may virtually sense a level of liquid within air cooler 30 and influence control of engine system 10 to limit or discontinue the recirculation of exhaust gas when the level of liquid within air cooler 30 may be likely to be greater than an acceptable value.

INDUSTRIAL APPLICABILITY

The disclosed virtual liquid sensor may be applicable for predicting the level of liquid within an air cooler associated with any engine system having exhaust gas recirculation. The disclosed virtual liquid sensor may predict when condensation formed within an air cooler is likely to accumulate and may allow a controller to limit or discontinue an amount of exhaust gas recirculated into the combustion air as a function thereof. The operation of engine system 10 and, in particular, control algorithm 100 will be explained below.

Engine system 10 may be associated with and configured to provide power to any device known in the art, such as, for example, a mobile vehicle, a marine vessel, and/or a generator. Accordingly, engine system 10 may operate in varying and significantly different operating conditions, including, for example, relatively low load conditions. In relatively low load conditions, the mass flow rate of combustion air directed through air cooler 30 may be insufficient to desirably purge accumulated condensation from within air cooler 30 to downstream components. As load conditions increase, the mass flow rate of combustion air directed through air cooler 30 increases and may subsequently become sufficient to desirably purge condensation to downstream components. However, abrupt increases in load conditions, such as, for example, transitioning from an idle condition to a high torque condition over a relatively short time period, may undesirably deliver a substantial amount of condensation from within air cooler 30 to inlet manifold 16 and/or combustion chambers 14. This phenomenon, conventionally known as engine slugging, may undesirably affect the operation and/or performance of engine 12 and/or engine system 10.

Controller 32 may receive a plurality of signals from sensors 34, 36, 38, perform control algorithm 100, and may influence the operation of valve 18 to reduce and/or eliminate exhaust gas recirculation to reduce the amount of condensation formed, and thus accumulated, within air cooler 30 to reduce the likelihood of engine slugging.

Referring to FIG. 2, controller 32 may receive one or more inputs, e.g., inputs 104, 106, from sensors 34, 36, 38 and may receive one or more inputs, e.g., inputs 102, 108, 122, as predetermined values indicative of the relative humidity of environments 20, 22 and geometric dimensions of air cooler 30. Controller 32 may, via control algorithm 100, determine a rate that condensation may be generated within (114) and purged from (118) air cooler 30. Controller 32 may also determine the amount of condensation, and thus the amount of liquid, accumulated within air cooler 30 (120) as a function of the generated and purged rates. Controller 32 may also determine the level of liquid within air cooler 30 (124) and may compare (126) the determined level with a predetermined value to determine whether or not the determined level is greater than the predetermined value. Controller 32 may establish output 128 as a function of the comparison of the determined liquid level and the predetermined value and may communicate output 128 to another algorithm to influence the operation of valve 18 and thus reduce or discontinue the amount of exhaust gas recirculated toward mixer 24.

By reducing the amount of exhaust gas recirculated toward mixer 24, controller 32, may reduce the amount of water vapor within the combustion air directed through air cooler 30 and less condensation may form within air cooler 30. Additionally, virtually sensing the level of liquid within air cooler 30 may enable a more accurate operational control of engine system 10 by balancing high percent exhaust gas recirculation, which may reduce emissions released to environment 20, and accumulation of condensation within air cooler 30, which may decrease the durability and/or performance of engine 12 and/or air cooler 30.

Because control algorithm 100 virtually determines a level of liquid within air cooler 30, aeration of the liquid may not adversely affect the determination thereof. Additionally, by controlling the recirculation of exhaust gas as a function of the virtually determined liquid level, control algorithm 100 may reduce the formation of condensation within air cooler 30 when engine load conditions may undesirably purge the condensation from air cooler 30. Furthermore, by virtually determining and correspondingly controlling the level of liquid within air cooler 30, air cooler 30 may not require a reservoir and drain to remove liquid therefrom.

It will be apparent to those skilled in the art that various modifications and variations can be made to the disclosed system for a virtual liquid sensor. Other embodiments will be apparent to those skilled in the art from consideration of the specification and practice of the disclosed method and apparatus. It is intended that the specification and examples be considered as exemplary only, with a true scope being indicated by the following claims and their equivalents

What is claimed is:

1. A method for operating a virtual liquid level sensor with respect to an engine system component comprising:
   determining a rate of generating condensation with respect to the component;
   determining a rate of purging condensation with respect to the component; and
   determining an amount of accumulated condensation with respect to the component as a function of the rate of generating condensation and the rate of purging condensation over a period of time.

2. The method of claim 1, wherein the rate of generating condensation is determined as a function of an amount of water vapor produced during a combustion process, an amount of exhaust gas recirculated into at least one combustion chamber, and a humidity of ambient air directed into the at least one combustion chamber.

3. The method of claim 1, wherein the rate of purging condensation is determined as a function of a flow rate of combustion air directed through the component, at least one dimension of the component, and a previously determined level of condensation within the component.

4. The method of claim 1, further including:
determining a level of condensation within the component as a function of the amount of accumulated condensation and at least one dimension of the component; and
comparing the determined level of condensation with a predetermined value.

5. The method of claim 4, further including reducing an amount of exhaust gas recirculated from at least one combustion chamber toward an inlet manifold if the determined level of condensation is greater than the predetermined value.

6. The method of claim 1, wherein the component is an air cooler configured to reduce a temperature of combustion air directed from a compressor toward at least one combustion chamber of an engine.

7. A virtual liquid sensor for an air cooler associated within an engine system having exhaust gas recirculation comprising:
a first sensor configured to produce a first signal indicative of a flow rate of combustion air directed through the air cooler;
at least one second sensor configured to produce at least one second signal indicative of at least one parameter associated with the engine system; and
a controller configured to receive the first signal and the at least one second signal and determine an amount of condensation accumulated within the air cooler as a function of the first signal and the at least one second signal.

8. The virtual liquid point sensor of claim 7, wherein the controller is further configured to:
receive at least one third signal indicative of at least one geometric dimension of the air cooler; and
determine a level of condensation within the air cooler as a function of the determined amount of condensation accumulated within the air cooler and the at least one third signal.

9. The virtual liquid sensor of claim 8, wherein the controller is further configured to receive a fourth signal indicative of a humidity of ambient air directed toward the air cooler and determine the amount of condensation accumulated within the air cooler by:
determining a rate of generating condensation within the air cooler as a function of the at least one second signal and the fourth signal;
determining a rate of purging condensation from the air cooler as a function of the first and the at least one third signal; and
determining the amount of condensation accumulated within the air cooler as a function of the rate of generating condensation and the rate of purging condensation.

10. The virtual liquid sensor of claim 7, wherein the controller is further configured to determine a purge rate of condensation with respect to the air cooler, the condensation purge rate being indicative of an amount of condensation removed from the air cooler by the flow of combustion air through the air cooler.

11. The virtual liquid sensor of claim 10, wherein the at least one second signal is a plurality of second signals and the controller is configured to determine the purge rate by:
determining a velocity of combustion air directed through the air cooler as a function of the first signal and a geometric dimension of the air cooler;
determining a level of condensation within the air cooler as a function of the amount of condensation accumulated within the air cooler and a geometric dimension of the air cooler; and
functionally relating the determined velocity and a previously determined level of condensation within the air cooler to determine the purge rate.

12. The virtual liquid sensor of claim 7, wherein the controller is further configured to determine a generation rate of condensation with respect to the air cooler, the generation rate being indicative of an amount of condensation formed within the air cooler from the flow of combustion air through the air cooler.

13. The virtual liquid sensor of claim 12, wherein the at least one second signal is a plurality of second signals and the controller is configured to determine the generation rate by:
determining an amount of water vapor within an exhaust gas produced as a by product of a combustion process as a function of at least one of the plurality of second signals;
determining an amount of exhaust gas directed through the air cooler as a function of at least one of the plurality of second signals; and
functionally relating the determined rate of water vapor within the exhaust gas, the determined amount of exhaust gas directed through the air cooler, and a relative humidity of ambient air directed through the air cooler.

14. The virtual liquid sensor of claim 7, wherein the determined amount of condensation accumulated within the air cooler is a function of a previously determined amount of condensation accumulated within the air cooler plus a rate change in condensation formed within the air cooler minus a rate change in condensation removed from the air cooler with respect to an elapsed time.

15. A method for controlling exhaust gas recirculation with respect to an engine comprising:
determining a level of liquid within a combustion air cooler as a function of at least one dimension of the combustion air cooler, at least one parameter of the engine, and a flow rate of combustion air through the combustion air cooler; and
reducing an amount of exhaust gas recirculated from downstream of the engine toward a mixer when the determined level of liquid is greater than a predetermined value.

16. The method of claim 15, wherein determining the level of liquid within the combustion air cooler includes:
determining a rate that condensation is generated within the combustion air cooler as a function of the at least one engine parameter and a value indicative of the relative humidity of ambient air;
determining a rate that condensation is removed from the combustion air cooler as a function of the at least one dimension of the combustion air cooler, the flow rate of combustion air through the combustion air cooler, and a previously determined level of liquid within the combustion air cooler; and
determining an amount of condensation accumulated within the combustion air cooler as a function of the rate that condensation is generated within the combustion air cooler and the rate that condensation is removed from the combustion air cooler.

17. The method of claim 16, wherein determining the rate that condensation is removed from the combustion air cooler further includes:
   determining a mass velocity of combustion air through the combustion air cooler as a function of the mass flow rate of the combustion air and the at least one dimension of the combustion air cooler; and
   accessing a multi-dimensional look-up map functionally relating mass velocities of combustion air and levels of liquid within the combustion air cooler with rates that condensation is removed from the air cooler.

18. The method of claim 16, wherein the at least one engine parameter is a plurality of engine parameters and determining the rate that condensation is generated within the combustion air cooler includes:
   determining an amount of water vapor produced during a combustion process as a function of the rate of fuel delivered to the engine; and
   determining an amount of exhaust gas recirculated from downstream of the engine toward the mixer as a function of at least one of the plurality of engine parameters.

19. The method of claim 16, wherein determining the level of liquid within the combustion air cooler further includes functionally relating the amount of condensation accumulated within the air cooler and at least one dimension of the combustion air cooler.

20. The method of claim 15, wherein exhaust gas is directed from downstream of the engine to the mixer via a valve, the method further including controlling the valve to reduce the amount of exhaust gas directed toward the mixer.

* * * * *